(12) United States Patent
He et al.

(10) Patent No.: US 10,992,512 B2
(45) Date of Patent: Apr. 27, 2021

(54) FILE SHARING METHOD, APPARATUS, AND STORAGE MEDIUM

(71) Applicant: TENCENT TECHNOLOGY (SHENZHEN) COMPANY LIMITED, Guangdong (CN)

(72) Inventors: Jun Zhi He, Shenzhen (CN); Jing Jing Liu, Shenzhen (CN); Li Jin, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/433,029

(22) Filed: Jun. 6, 2019

(65) Prior Publication Data

US 2019/0288902 A1 Sep. 19, 2019

Related U.S. Application Data

(63) Continuation of application No. PCT/CN2018/078391, filed on Mar. 8, 2018.

(30) Foreign Application Priority Data

Mar. 31, 2017 (CN) .......................... 201710210096.8

(51) Int. Cl.
*H04L 29/08* (2006.01)
*G06F 16/176* (2019.01)
(Continued)

(52) U.S. Cl.
CPC ...... *H04L 29/08117* (2013.01); *G06F 16/176* (2019.01); *G06F 16/182* (2019.01);
(Continued)

(58) Field of Classification Search
CPC .................................................. H04L 29/08117
See application file for complete search history.

(56) References Cited

U.S. PATENT DOCUMENTS

| 7,590,667 B2* | 9/2009 | Yasuda | G06F 16/184 |
| 2016/0378782 A1* | 12/2016 | Jiang | G06F 21/6209 726/7 |
| 2017/0351690 A1* | 12/2017 | Perez | G06F 16/13 |

FOREIGN PATENT DOCUMENTS

| CN | 104410615 A | 3/2015 |
| CN | 104410680 A | 3/2015 |

(Continued)

OTHER PUBLICATIONS

International Search Report of PCT/CN2018/078391 dated May 30, 2018.

*Primary Examiner* — Adnan M Mirza
(74) *Attorney, Agent, or Firm* — Sughrue Mion, PLLC

(57) ABSTRACT

A file sharing method is provided. A shared directory generation request is received from a terminal associated with a first account, and a shared directory corresponding to the first account is generated. A second account identifier is received from the terminal associated with the first account a second account is obtained based on the second account. An access address of the shared directory is transmitted to a terminal associated with the second account. Access permission to access the shared directory is assigned to the second account. A file access request with respect to the access address is received from the terminal associated with the second account. The shared directory corresponding to the access address and the access permission of the second account are obtained, and the file access request is responded based on the access permission.

20 Claims, 16 Drawing Sheets

(51) Int. Cl.
*H04L 12/58* (2006.01)
*H04L 29/06* (2006.01)
*G06F 16/182* (2019.01)

(52) U.S. Cl.
CPC ............ *H04L 51/046* (2013.01); *H04L 63/10* (2013.01); *H04L 63/101* (2013.01); *H04L 67/32* (2013.01)

(56) References Cited

FOREIGN PATENT DOCUMENTS

| | | |
|---|---|---|
| CN | 104794646 A | 7/2015 |
| CN | 105760775 A | 7/2016 |
| CN | 106998329 A | 8/2017 |

\* cited by examiner

US 10,992,512 B2

FILE SHARING METHOD, APPARATUS, AND STORAGE MEDIUM

CROSS-REFERENCE TO RELATED APPLICATION(S)

This application is a continuation application of International Application No. PCT/CN2018/078391, filed with the Chinese Patent Office on Mar. 8, 2018, which claims priority to Chinese Patent Application No. 201710210096.8, entitled "FILE SHARING METHOD AND APPARATUS" filed with the Chinese Patent Office on Mar. 31, 2017, the disclosures of which are herein incorporated by reference in their entireties.

BACKGROUND

1. Field

Example embodiments relate to the field of Internet technologies, and in particular, to a file sharing method and a file sharing apparatus, and a storage medium therefor.

2. Description of the Related Art

Currently, continuous development of Internet technologies and terminal technologies provide various functions to users such as entertaining, reading, and working by using terminals. In particular, based on developments in cloud storage technologies in recent years, a user may store a file in a cloud disk server, and logs into the cloud disk server to view the file when needed. In order to send a file to another user, the user may also log into the cloud disk server to obtain, from the cloud disk server, the file and send the file to a target person or a target group by using, for example, instant messaging software.

SUMMARY

One or more example embodiments provide a file sharing method and a file sharing apparatus, and a storage medium therefor, in which speed, usability, and efficiency in file sharing is improved.

According to an aspect of an example embodiment, a file sharing method is provided. A shared directory generation request is received from a terminal associated with a first account, and a shared directory corresponding to the first account is generated. A second account identifier is received from the terminal associated with the first account a second account is obtained based on the second account. An access address of the shared directory is transmitted to a terminal associated with the second account. Access permission to access the shared directory is assigned to the second account. A file access request with respect to the access address is received from the terminal associated with the second account. The shared directory corresponding to the access address and the access permission of the second account are obtained, and the file access request is responded based on the access permission.

According to an aspect of an example embodiment, provided is a file sharing apparatus, including: at least one memory operable to store program code; and at least one processor operable to access said at least one memory, read said program code, and operate according to said program code. The program code includes: shared directory generation code configured to cause the at least one processor to receive a shared directory generation request from a terminal associated with a first account and generate a shared directory corresponding to the first account; second account determination code configured to cause the at least one processor to receive a second account identifier from the terminal associated with the first account, and obtain a second account based on the second account identifier; access address transmission code configured to cause the at least one processor to transmit an access address of the shared directory to a terminal associated with the second account; access permission assignment code configured to cause the at least one processor to assign, to the second account, access permission to access the shared directory; and file access response code configured to cause the at least one processor to receive a file access request with respect to the access address from the terminal associated with the second account, obtain the shared directory corresponding to the access address, obtain the access permission of the second account, and respond to the file access request based on the access permission.

According to an aspect of an example embodiment, provided is a non-transitory computer-readable storage medium storing computer-readable instructions that are executable by at least one processor to perform: receiving, by the at least one processor, a shared directory generation request from a terminal associated with a first account, and generating a shared directory corresponding to the first account; receiving a second account identifier from the terminal associated with the first account, and obtaining a second account based on the second account identifier; transmitting an access address of the shared directory to a terminal associated with the second account; assigning, to the second account, access permission to access the shared directory; and receiving a file access request with respect to the access address from the terminal associated with the second account, obtaining the shared directory corresponding to the access address, obtaining the access permission of the second account, and responding to the file access request based on the access permission.

According to an aspect of an example embodiment, a file sharing method is provided. The method includes: receiving a shared directory creation request sent by a terminal of a first account, and creating a shared directory corresponding to the first account; receiving a second account identifier sent by the terminal associated with the first account, and obtaining a corresponding second account according to the second account identifier, the second account identifier being an account identifier selected by a user on the terminal associated with the first account; sending an access address of the shared directory to a terminal associated with the second account; assigning access permission for the shared directory to the second account; and receiving a file access request for the access address that is sent by the terminal associated with the second account, obtaining the shared directory corresponding to the access address, obtaining the access permission of the second account for the shared directory, and responding to the file access request according to the access permission.

According to another aspect of an example embodiment, a file sharing method is provided. The method is based on a cloud disk server and includes: receiving a shared directory creation request sent by a terminal of a first account, and creating a shared directory corresponding to the first account; receiving a second account identifier sent by the terminal associated with the first account, and obtaining a corresponding second account according to the second account identifier, the second account identifier being an account identifier selected by a user on the terminal associated with the first account; sending an access address of the shared directory to a terminal associated with the second account; assigning access permission for the shared directory to the second account; and receiving a file access request for the access address that is sent by the terminal associated with the second account, obtaining the shared directory corresponding to the access address, obtaining the access permission of the second account for the shared directory, and responding to the file access request according to the access permission.

According to still another aspect of an example embodiment, a file sharing apparatus is provided. The apparatus is based on a cloud disk server and includes at least at least one memory and at least one processor, the at least one memory storing at least one instruction module configured to be executed by the at least one processor, the at least one instruction module including: a shared directory creation module, configured to: receive a shared directory creation request sent by a terminal of a first account, and create a shared directory corresponding to the first account; a second account determining module, configured to: receive a second account identifier sent by the terminal associated with the first account, and obtain a corresponding second account according to the second account identifier, the second account identifier being an account identifier selected by a user on the terminal associated with the first account; an access address sending module, configured to send an access address of the shared directory to a terminal associated with the second account; an access permission assignment module, configured to assign access permission for the shared directory to the second account; and a file access response module, configured to: receive a file access request for the access address that is sent by the terminal associated with the second account, obtain the shared directory corresponding to the access address, obtain the access permission of the second account for the shared directory, and respond to the file access request according to the access permission.

According to still another aspect of an example embodiment, a file sharing method is provided. The method includes: receiving an entered shared directory creation instruction, obtaining a first account logged into on a cloud disk server, and sending a shared directory creation request to the cloud disk server, the shared directory creation request being used for instructing the cloud disk server to create a shared directory corresponding to the first account; receiving an account identifier delivered by the cloud disk server, and presenting the account identifier, the account identifier being an identifier of an associated account of the first account on a social relationship chain; obtaining an account identifier selected by a user, and using the account identifier selected by the user as a second account identifier and sending the second account identifier to the cloud disk server, so that the cloud disk server obtains a corresponding second account according to the second account identifier, assigns access permission for the shared directory to the second account, and sends an access address of the shared directory to a terminal associated with the second account; and receiving the access address sent by the cloud disk server, sending a file access request for the access address to the cloud disk server, so that the cloud disk server obtains the shared directory corresponding to the access address, obtains the access permission for the shared directory that is of the second account corresponding to a sending terminal of the file access request, and responds to the file access request according to the access permission.

According to still another aspect of an example embodiment, a file sharing method is provided. The method is based on a terminal and includes: receiving an entered shared directory creation instruction, obtaining a first account logged into on a cloud disk server, and sending a shared directory creation request to the cloud disk server, the shared directory creation request being used for instructing the cloud disk server to create a shared directory corresponding to the first account; receiving an account identifier delivered by the cloud disk server, and presenting the account identifier, the account identifier being an identifier of an associated account of the first account on a social relationship chain; obtaining an account identifier selected by a user, and using the account identifier selected by the user as a second account identifier and sending the second account identifier to the cloud disk server, so that the cloud disk server obtains a corresponding second account according to the second account identifier, assigns access permission for the shared directory to the second account, and sends an access address of the shared directory to a terminal associated with the second account; and receiving the access address sent by the cloud disk server, sending a file access request for the access address to the cloud disk server, so that the cloud disk server obtains the shared directory corresponding to the access address, obtains the access permission for the shared directory that is of the second account corresponding to a sending terminal of the file access request, and responds to the file access request according to the access permission.

According to still another aspect of an example embodiment, a file sharing apparatus is provided. The apparatus is based on a terminal and includes at least one memory and at least one processor, the at least one memory storing at least one instruction module configured to be executed by the at least one processor, the at least one instruction module including: a shared directory creation module, configured to: receive an entered shared directory creation instruction, obtain a first account logged into on a cloud disk server, and send a shared directory creation request to the cloud disk server, the shared directory creation request being used for instructing the cloud disk server to create a shared directory corresponding to the first account; an account identifier presentation module, configured to: receive an account identifier delivered by the cloud disk server, and present the account identifier, the account identifier being an identifier of an associated account of the first account on a social relationship chain; a second account selection module, configured to: obtain an account identifier selected by a user, and use the account identifier selected by the user as a second account identifier and send the second account identifier to the cloud disk server, so that the cloud disk server obtains a corresponding second account according to the second account identifier, assigns access permission for the shared directory to the second account, and sends an access address of the shared directory to a terminal associated with the second account; and a file access request module, configured to: receive the access address sent by the cloud disk server, and send a file access request for the access address to the cloud disk server, so that the cloud disk server obtains the shared directory corresponding to the access address, obtains the access permission for the shared directory that is of the second account corresponding to a sending terminal of the file access request, and responds to the file access request according to the access permission.

According to still another aspect of an example embodiment, a computer-readable storage medium is provided, storing computer-readable instructions or programs, the computer-readable instructions or programs being executed by a processor to perform the foregoing file sharing method.

BRIEF DESCRIPTION OF THE DRAWINGS

These and/or other aspects will become apparent and more readily appreciated from the following description of the embodiments, taken in conjunction with the accompanying drawing. Apparently, the accompanying drawings in the following description show only some embodiments, and a person of ordinary skill in the art may still derive other drawings from these accompanying drawings without creative efforts.

DETAILED DESCRIPTION

The following clearly and completely describes the technical solutions in the example embodiments of the disclosure with reference to the accompanying drawings. Obviously, the described embodiments are only some embodiments instead of all embodiments of the disclosure. All other embodiments obtained by a person of ordinary skill in the art based on the embodiments without creative efforts shall fall within the protection scope of the disclosure.

To solve a technical problem of requiring a complex operation process in which the user needs to send the files one by one during file sharing based on a cloud disk server in the conventional technology, a file sharing mechanism that improves speed, usability, and efficiency in file sharing is provided in the example embodiments.

Figure 1:
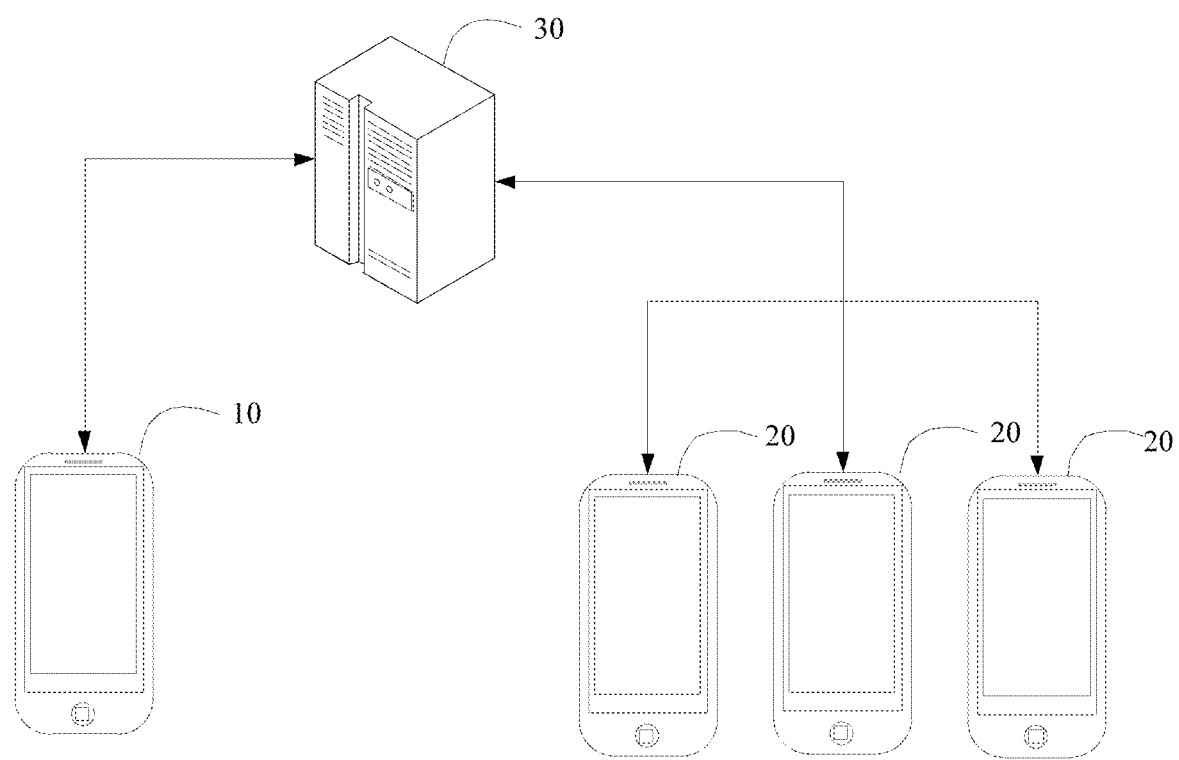
FIG. 1 is a schematic composition diagram of a file sharing system according to an embodiment.
Figure 2:
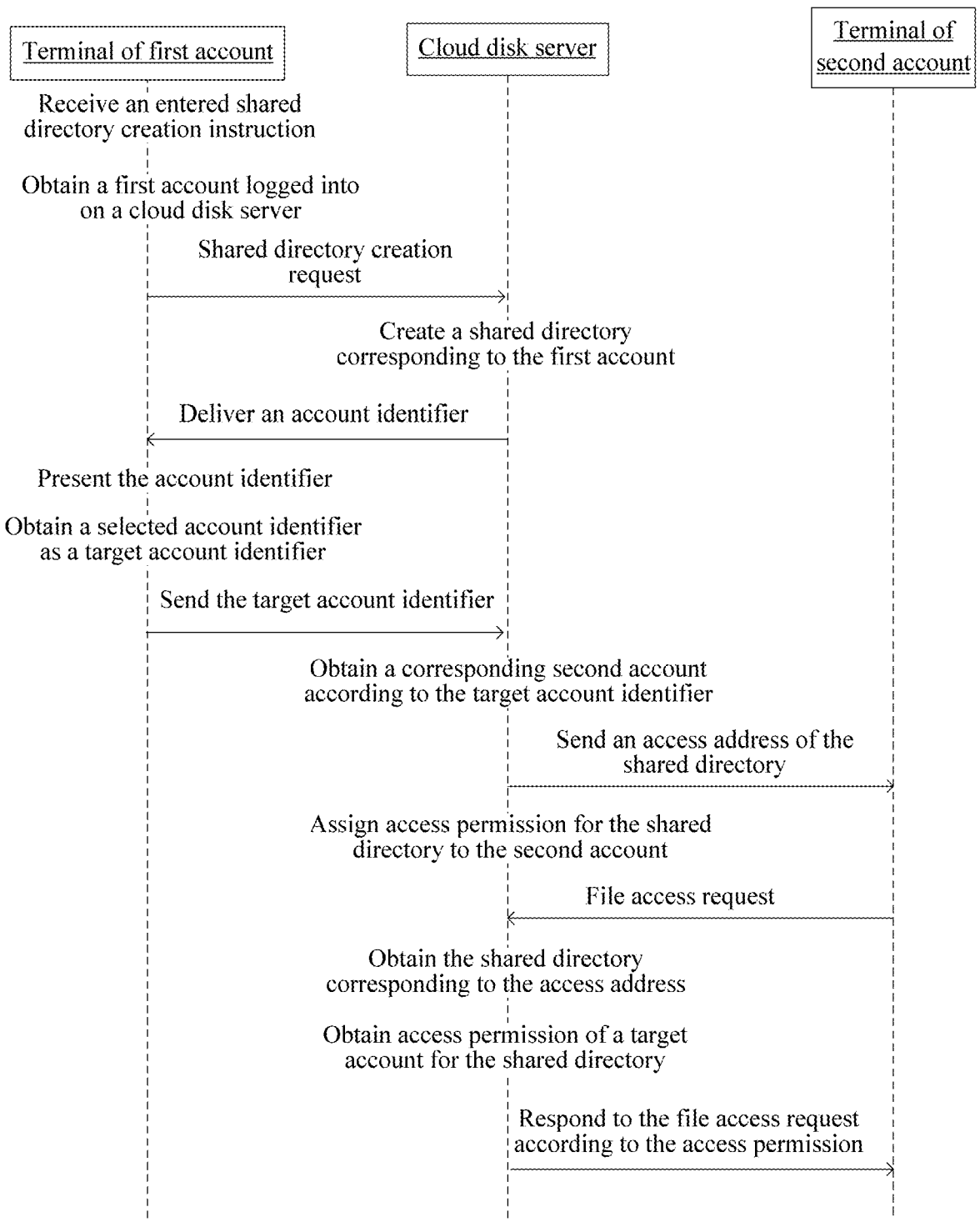
FIG. 2 is a schematic interaction diagram of a file sharing process according to an embodiment.

FIG. 1 is a schematic diagram of an interaction process of implementation of a file sharing mechanism. The implementation of the file sharing mechanism is based on a file sharing system shown in FIG. 2. The file sharing system includes an initiation terminal (or a terminal associated with a first account) 10 of a target file to be shared, a receive terminal (or a terminal associated with a second account) 20 of the target file, and a cloud disk server 30.

The terminal 10 associated with the first account may upload, to the cloud disk server 30 by using a file sharing application program (for example, Weiyun) installed on the terminal 10, a file to be shared, and may log into the cloud disk server to view the file when needed. In an example embodiment, a user corresponding to the first account may further share a file stored in the cloud disk server with another user, so that the another user can access the cloud disk server to access the corresponding file. In an example embodiment, there may be a plurality of terminals 20 of second accounts. For example, when the terminal associated with the first account sends the shared file to terminals corresponding to a plurality of accounts, all of the terminals that receive the shared file may access the shared file.

In an example embodiment, the foregoing implementation of file sharing includes a file sharing method based on the terminal 10 associated with the first account, a file sharing method based on the cloud disk server 30, and a shared file access method based on the terminal 20 of the second account. In addition, implementation of the foregoing methods may depend on computer programs, and the computer programs may run on a Von Neumann-based computer system. The computer programs may be, for example, a cloud file sharing application program installed on the terminal 10 associated with the first account or the terminal 20 of the second account, a file sharing application program based on the cloud disk server 30, anchor other application programs.

Figure 3:
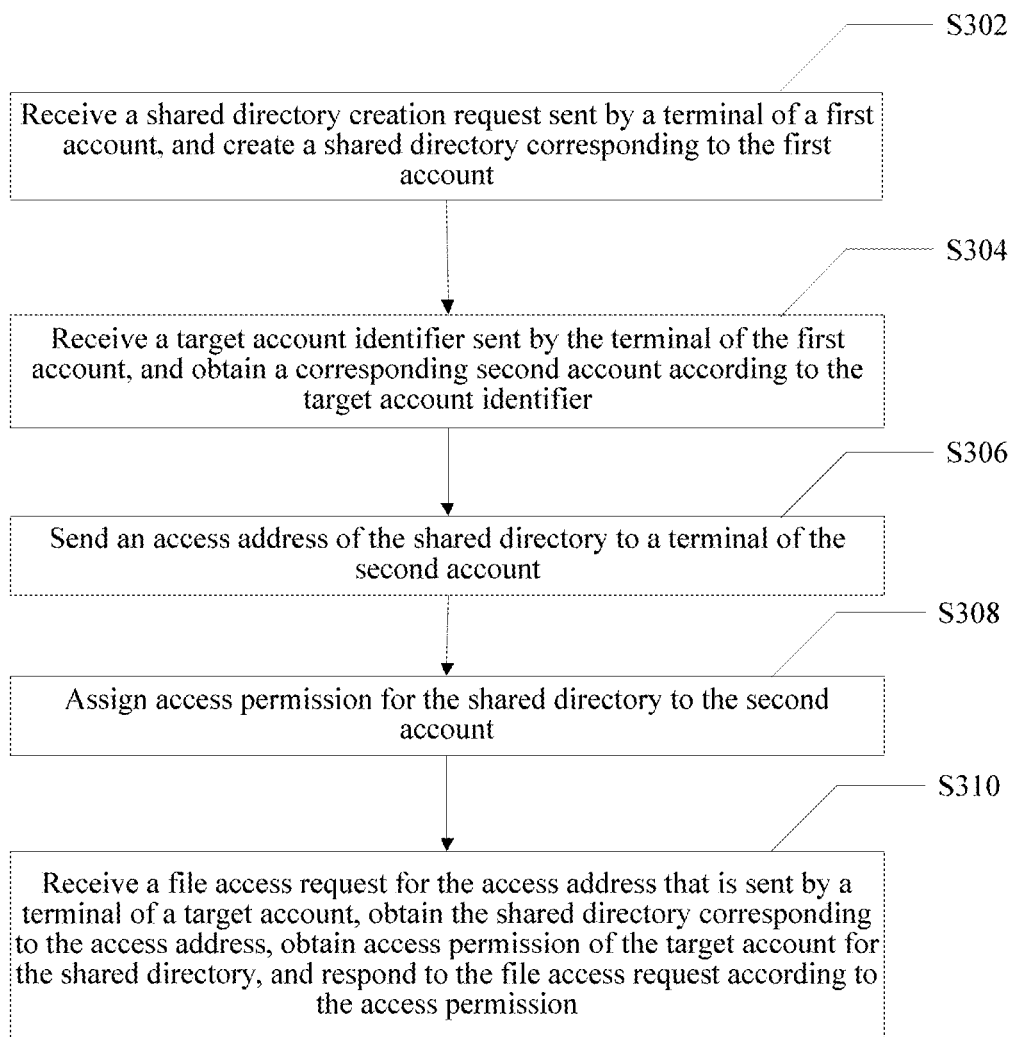
FIG. 3 is a schematic flowchart of a file sharing method based on a cloud disk server according to an embodiment.

FIG. 3 is a schematic flowchart of a file sharing method running on a cloud disk server 30. As shown in FIG. 3, the file sharing method running on a cloud disk server 30 includes the following operations S302 to 310:

Operation S302: The cloud disk server receives a shared directory creation request (or a shared directory generation request) sent by a terminal associated with a first account, and creates a shared directory corresponding to the first account.

A user may initiate a login request for the cloud disk server on the terminal associated with the first account, for example, initiates an account login request for the cloud disk server in an operation page of a corresponding login account by using a cloud disk sharing application program installed on the terminal associated with the first account. When the cloud disk server verifies account information and a login password that are included in the account login request, and the verification succeeds, login of the first account is complete, so as to establish a communication connection between the terminal associated with the first account and the cloud disk server. After the communication connection between the terminal associated with the first account and the cloud disk server is successfully established, the user may use the terminal associated with the first account to send a message to the cloud disk server or receive data or a file delivered by the cloud disk server, and the cloud disk server may also send a message to the terminal associated with the first account by using the communication connection.

Before the server detects the shared directory creation request sent by the terminal associated with the first account, the user further needs to enter a related operation of shared target creation by using the terminal associated with the first account, to complete initiation of the shared directory creation request.

Figure 4:
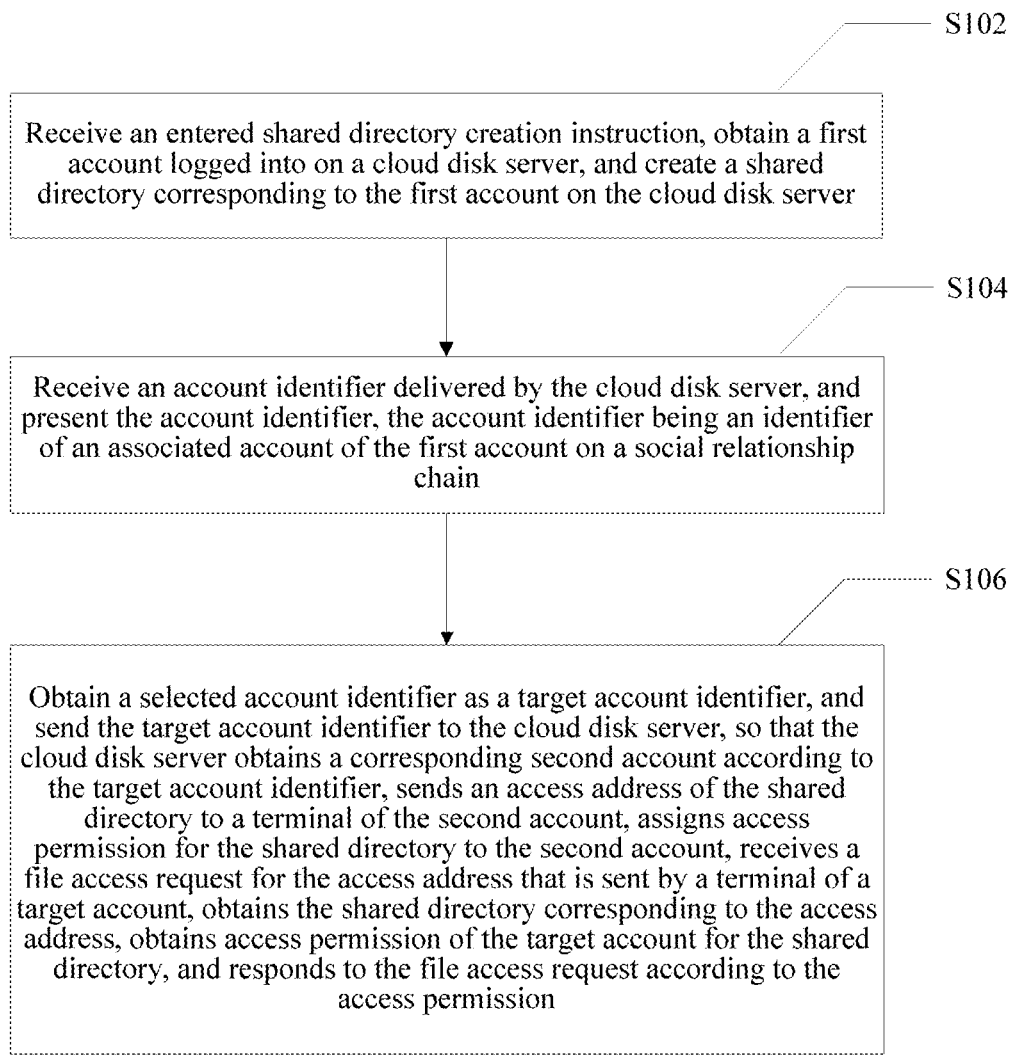
FIG. 4 is a schematic flowchart of a file sharing method based on a terminal associated with a first account according to an embodiment.

Specifically, referring to FIG. 4, a file sharing method running on the terminal 10 associated with the first account may further include operation S102, prior to operation S302. In operation S302, the terminal associated with the first account receives an entered shared directory creation instruction, obtains the first account logged into on the cloud disk server, and creates the shared directory corresponding to the first account on the cloud disk server. That is, the terminal associated with the first account receives the entered shared directory creation instruction, obtains the first account logged into on the cloud disk server, and sends the shared directory creation request to the cloud disk server, the shared directory creation request being used for instructing the cloud disk server to create the shared directory corresponding to the first account.

Figure 5:
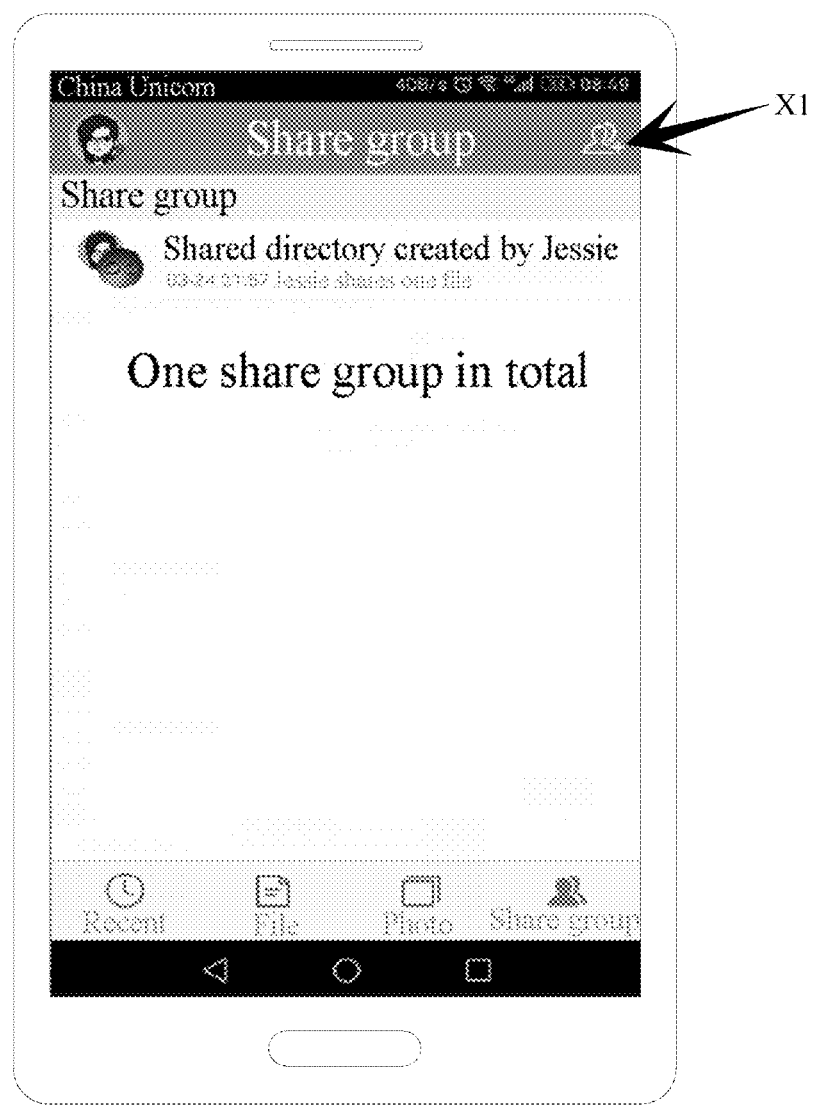
FIG. 5 is a schematic diagram of a page of a shared directory of a cloud disk application according to an embodiment.
Figure 6:
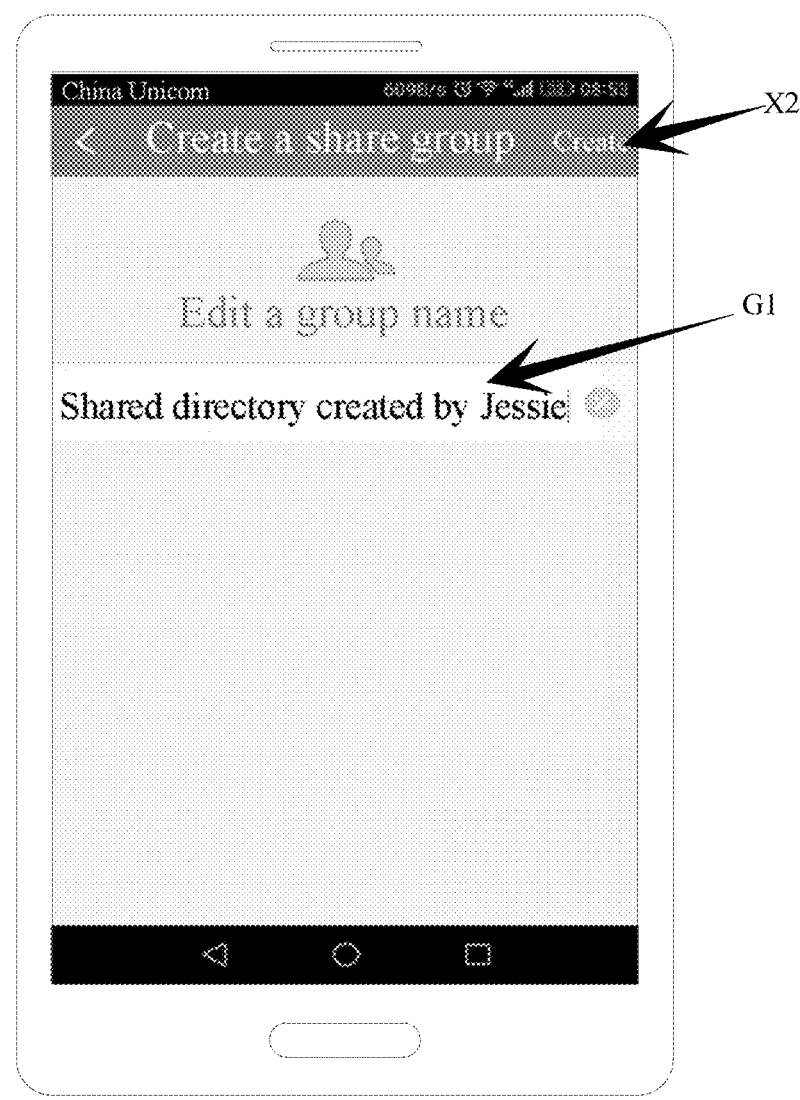
FIG. 6 is a schematic diagram of a creation page of a shared directory in a cloud disk application according to an embodiment.

In an operation page of a cloud disk file sharing application program shown in FIG. 5, the user may tap a button (or a button for shared directory creation) indicated by a reference character X1 in FIG. 5, to create a new shared directory, and in a creation page of the shared directory shown in FIG. 6, the user may enter identification information "Shared directory created by Jessie" of the newly created shared directory in an entry box G1, to complete entry of the shared directory creation instruction. For example, in an application scenario shown in FIG. 6, if the user taps a button (or "Create" button) indicated by a reference character X2, it indicates that the user sends a shared directory creation instruction, and the identification information of the created shared directory is "Shared directory created by Jessie".

It is described in an example embodiment that the user performs a tapping operation to select and perform the shared directory creation; however, this is merely an example and a person of ordinary skill in the art should understand that the disclosure can be applied to any form of user manipulation on the terminal to create the shared directory.

In an example embodiment, after the user enters the shared directory creation instruction or the like by using the terminal associated with the first account, the first account logged into on the cloud disk server on the terminal is obtained. For example, when the user enters the shared directory creation instruction by using a cloud disk file sharing application program installed on the terminal, the first account logged into is an account logged into in the cloud disk file sharing application program.

When the first account logged into is determined, the shared directory creation request may be sent to the cloud disk server. The shared directory creation request includes an account identifier sending the request, that is, identification information of the first account. In addition, the shared directory creation request further includes identification information of the created shared directory. After receiving the shared directory creation request sent by the terminal associated with the first account, the server parses the received shared directory creation request, obtains the identification information of the shared directory to be created and the account identifier that creates the shared directory, and then creates the corresponding shared directory. In addition, the shared directory corresponds to the first account.

After the shared directory corresponding to the first account is successfully created, a file may be added to the shared directory. For example, a local file of the terminal associated with the first account may be uploaded to the cloud disk server and added to the shared directory. Alternatively, a file already stored on the cloud disk server may be added to the shared directory. In another embodiment, alternatively, a file in another shared directory corresponding to the first account may be added to the shared directory (that is, a same file may be included in a plurality of shared directories). Specifically, the user may enter a corresponding operation instruction on the terminal associated with the first account to a target shared directory, a target file to be added. That is, the terminal associated with the first account receives a file addition request entered for the shared directory, obtains a target file identifier included in the file addition request, and sends the shared directory and the target file identifier to the cloud disk server.

It should be noted that, in an example embodiment, adding a file to the shared directory does not add complete date corresponding to the file to the shared directory, but establishes a mapping relationship between the file and the shared directory. In addition, the file is stored in the cloud disk server, and establishing the mapping relationship between the file and the shared directory corresponds to establishing a mapping relationship between a storage address of the file in the cloud disk server and the shared directory. When accessing a file in the shared directory, the user determines, by using a mapping relationship between a storage address of the file in the cloud disk server and the shared directory, the storage address of the file needing to be accessed in the cloud disk server, and then accesses the corresponding file by accessing the storage address.

When a file is added to a plurality of shared directories, mapping relationships between a storage address of the file in the cloud disk server and the plurality of shared directories are established, and a plurality of copies of the file does not need to be stored.

Figure 7:
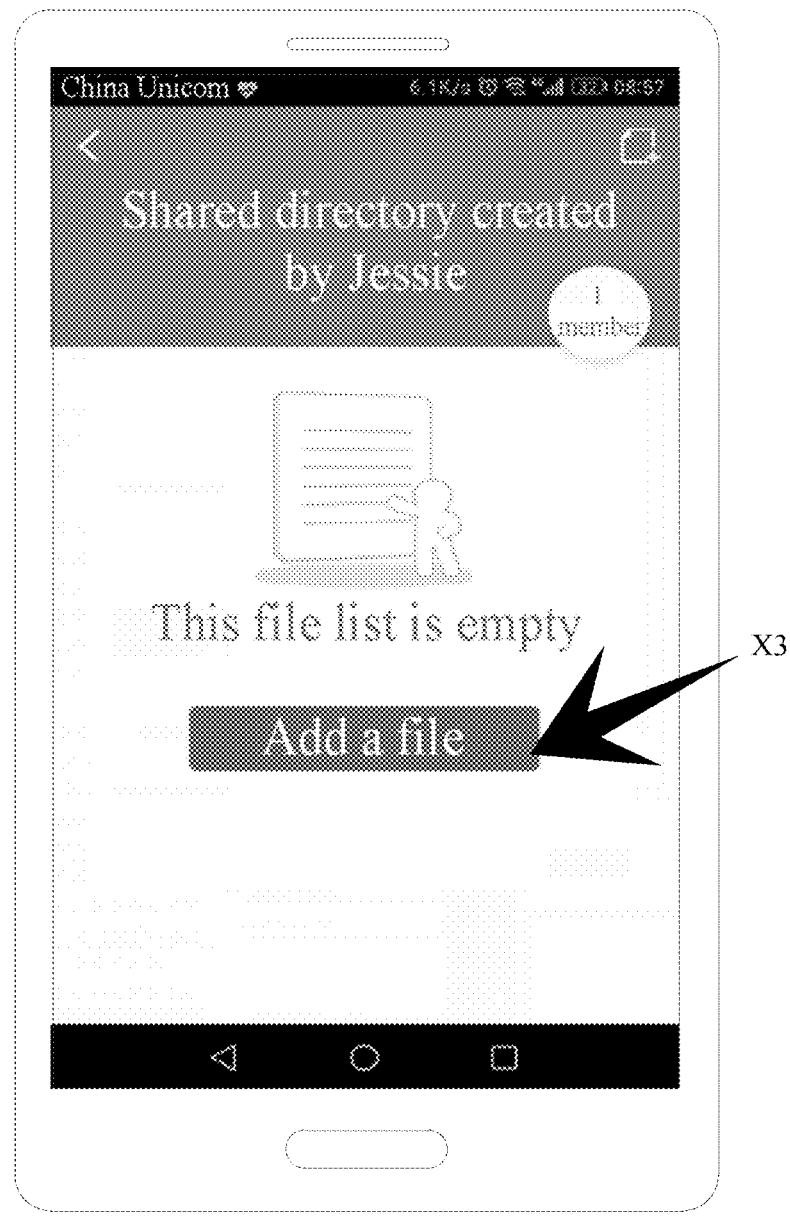
FIG. 7 is a schematic diagram of a page of a shared directory of a cloud disk application according to an embodiment.
Figure 8:
FIG. 8 is a schematic diagram of an operation page of adding a file to a shared directory according to an embodiment.

For example, in an application scenario shown in FIG. 7, a page of the shared directory whose identification information is "Shared directory created by Jessie" is presented. In this page, the user may tap a button "Add a file" indicated by X3 to add another file to the shared directory, that is, add the another file to the current shared directory by using a page shown in FIG. 8. As shown in FIG. 8, when adding a file to the shared directory, the user may add, to the shared directory, a file that is already stored on the cloud disk server but is not included in the shared directory, that is, a file "Welcome to Weiyun.pdf" indicated by X4 in FIG. 8. It should be noted that a file that is already stored in the cloud disk server and is to be added to a shared directory may not be included in any shared directory, or may be included in another shared directory. In another embodiment, the file added by the user to the shared directory may be any file locally stored on the terminal. As shown in FIG. 8, the user may tap a button "Local" indicated by X5 to view a file list of files locally stored on the terminal, so as to select the target file to be added.

After the user selects the file to be added to the shared directory, the terminal obtains the file identifier of the target file selected by the user, generates the file addition request according to the file identifier of the target file and the shared directory, and sends the file addition request to the cloud disk server, so that the cloud disk server adds the target file to the shared directory.

After receiving the file addition request sent by the terminal associated with the first account, the cloud disk server parses the received file addition request, and obtains the target file identifier included in the file addition request. The target file identifier is the identification information of the file stored in cloud storage space. The cloud disk server then adds the target file identifier to the shared directory.

It should be noted that in an example embodiment, if the target file added to the shared directory is a file already stored in the cloud disk server, the file identifier of the target file is directly added to the shared directory; and if the target file added to the shared directory is a file locally stored in the terminal, the terminal uploads the file to the cloud disk server, and then the cloud disk server adds the file identifier of the uploaded target file to the shared directory.

After the shared directory corresponding to the first account is successfully created, the user corresponding to the first account may send the shared directory to another user, so that the another user may also view the file in the shared directory, and therefore file sharing may be performed.

The terminal associated with the first account may send related information of the shared directory to the another user by using instant messaging software, for example, send the related information of the shared directory to a friend on chat software such as QQ® or WeChat® by using the chat software such as QQ® or WeChat®.

In an example embodiment, an associated account on a social relationship chain of the first account logged into may be presented on the terminal associated with the first account, and the user may select, from the presented associated account, an identifier of an associated account to which the shared directory is to be sent, that is, a target account identifier. Referring back to FIG. 4, operation S104 may be performed. In operation S104, the terminal associated with the first account receives an account identifier delivered by the cloud disk server, and presents the account identifier, the account identifier being an identifier of an associated account of the first account on a social relationship chain.

Figure 9:
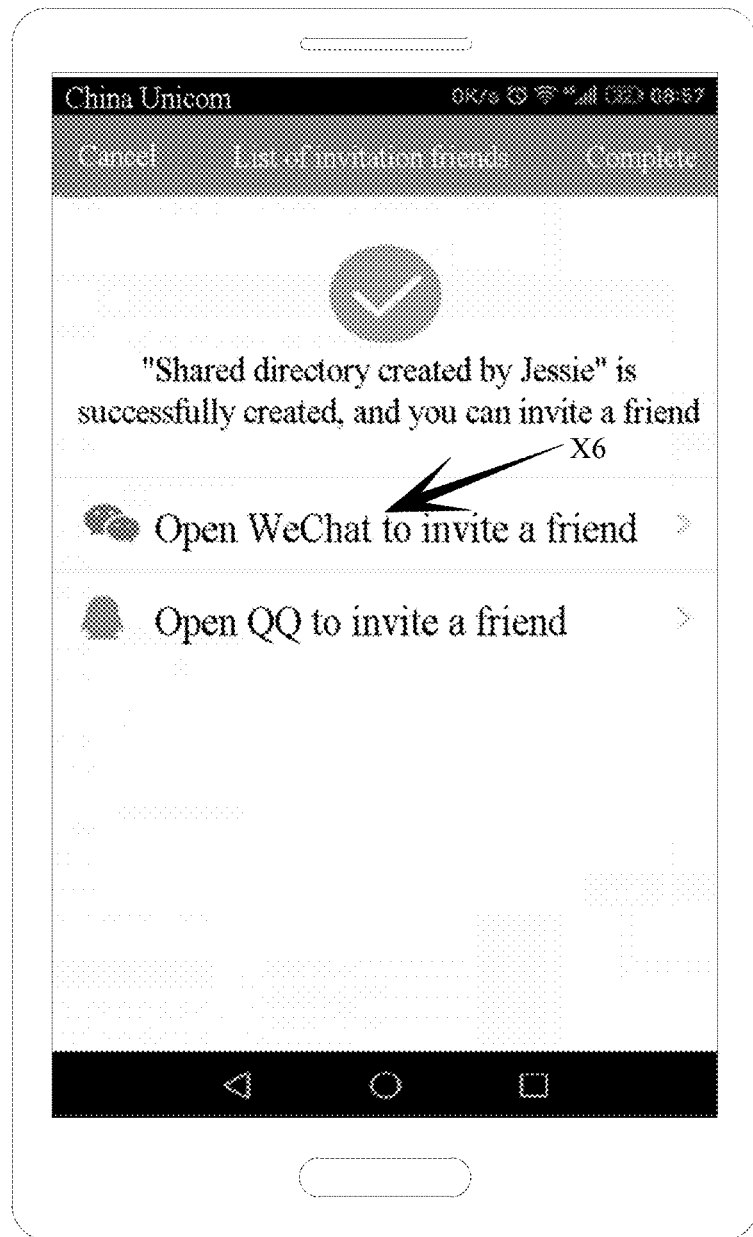
FIG. 9 is a schematic diagram of an operation page of sending a shared directory according to an embodiment.
Figure 10:
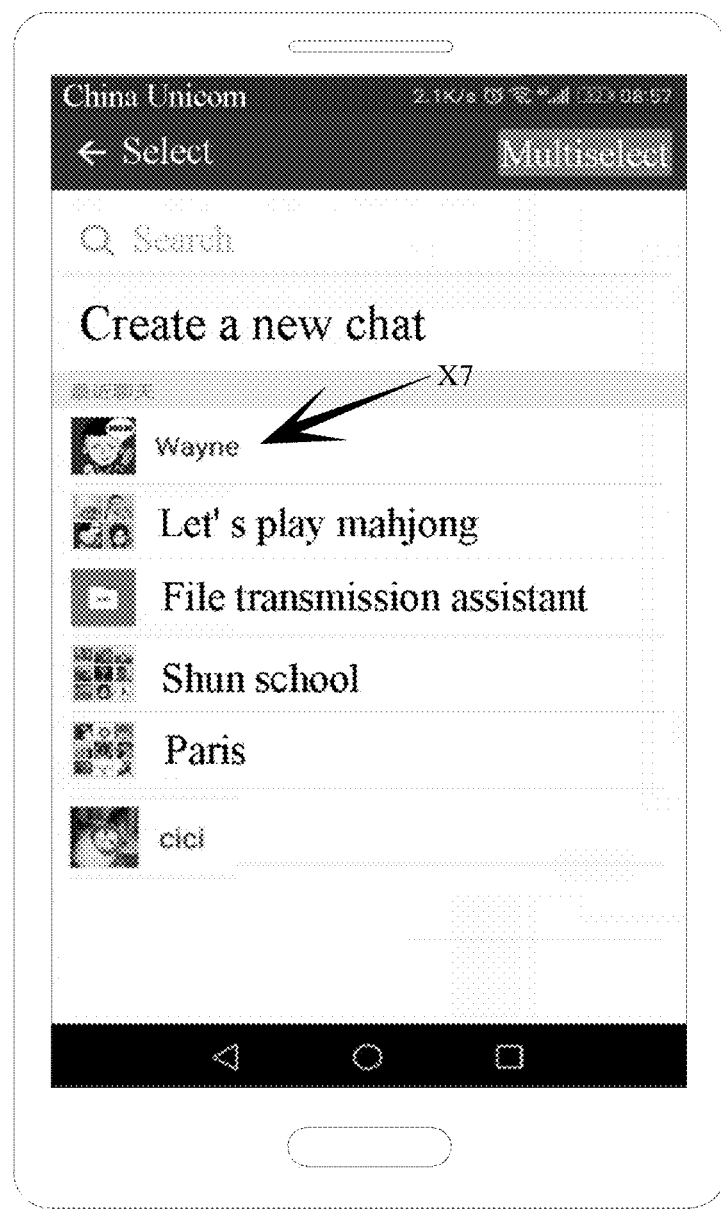
FIG. 10 is a schematic diagram of an operation page of sending a shared directory according to an embodiment.

In order to send the shared directory to another user, the user may obtain, by using a page shown in FIG. 9, an account identifier of an account with which the shared directory can be shared. For example, in FIG. 9, the user may tap a menu "Open WeChat to invite a friend" indicated by X6 to send the shared directory to a friend of the user in the WeChat® application. In an application scenario shown in FIG. 10, the user may select, by using a selection operation, the target account identifier used as a target sharing user. For example, in the application scenario shown in FIG. 10, the user taps an account identifier corresponding to a user whose account identifier is "Wayne" indicated by X7 to select the account identifier as the target account identifier.

Referring back to FIG. 4, operation S106 may be performed. In operation S106, the terminal associated with the first account obtains a selected account identifier as a target account identifier, and sends the target account identifier to the cloud disk server, so that the cloud disk server obtains a corresponding second account according to the target account identifier, sends an access address of the shared directory to a terminal associated with the second account, assigns access permission to access the shared directory to the second account, receives a file access request for the access address that is sent by a terminal associated with a target account, obtains the shared directory corresponding to the access address, obtains access permission of the target account for the shared directory, and responds to the file access request according to the access permission.

Because there is a computer program corresponding to the file sharing method performed by a first terminal, and there may also be a computer program corresponding to the file sharing method performed by a second terminal, the foregoing operation S106 may alternatively include the following operations S1061 and S1062:

S1061: Obtain an account identifier selected by a user, and use the account identifier selected by the user as a second account identifier and send the second account identifier to the cloud disk server, so that the cloud disk server obtains a corresponding second account according to the second account identifier, assigns access permission for the shared directory to the second account, and sends an access address of the shared directory to a terminal associated with the second account.

S1062: Receive the access address sent by the cloud disk server, and send a file access request for the access address to the cloud disk server, so that the cloud disk server obtains the shared directory corresponding to the access address, obtains the access permission for the shared directory that is of the second account corresponding to a sending terminal of the file access request, and responds to the file access request according to the access permission.

It should be noted that in an example embodiment, the user corresponding to the first account may select, from one or more of the account identifier of the associated account that is presented, an account identifier as the target account identifier.

It should be noted that in an example embodiment, there may be one target account identifier. That is, the user selects, from one or more of the account identifier of the associated account that is presented, one account identifier as the target account identifier, and an account corresponding to the target account identifier is a target share user of the shared directory. In another embodiment, alternatively, there may be a plurality of target account identifiers, or the target account identifier is a group identifier corresponding to a target group. That is, the associated account may belong to an individual user, or may belong to a user group including a plurality of users. When selecting the target account identifier, the user may select, from the one or more of the presented account identifier, a group identifier corresponding to one user group as the target account identifier, or may select account identifiers corresponding to a plurality of account identifiers as target account identifiers.

After determining the target account identifier, the terminal associated with the first account may send the determined target account identifier to the cloud disk server, so that the cloud disk server performs a next operation of the file sharing.

Referring back to FIG. 3, the file sharing method may further include operation S304. In operation S304, the cloud disk server receives a target account identifier sent by the terminal associated with the first account, and obtains a corresponding second account according to the target account identifier.

It should be noted that the target account includes the second account, and also includes a third account different from the second account, wherein the second account has access permission, but the third account has no access permission, and the access permission includes a plurality types of permission. Specific permission is described later.

It may be understood that the target account herein is the second account, and the target account identifier is the second account identifier. That is, operation S304 may alternatively be an operation in which the cloud disk server receives a second account identifier sent by the terminal associated with the first account, and obtains a corresponding second account according to the second account identifier, the second account identifier being an account identifier selected by a user on the terminal associated with the first account.

After receiving the target account identifier sent by the terminal, the cloud disk server determines the second account corresponding to the target account identifier according to the target account identifier. For example, when the target account identifier is a user identifier, an account corresponding to the target account identifier is the second account, and when the target account identifier is a user group identifier, all accounts corresponding to the user group identifier in the user group are second accounts. That is, there may be one or a plurality of second accounts.

Referring back to FIG. 3, the file sharing method may further include operation S306. In operation S306, the cloud disk server sends an access address of the shared directory to a terminal associated with the second account.

After determining the second account with which the terminal associated with the first account is to share the shared directory, the cloud disk server may send the access address of the shared directory to the terminal associated with the second account. In an example embodiment, the access address of the shared directory may be sent to the terminal associated with the second account by using the instant messaging software.

Figure 11:
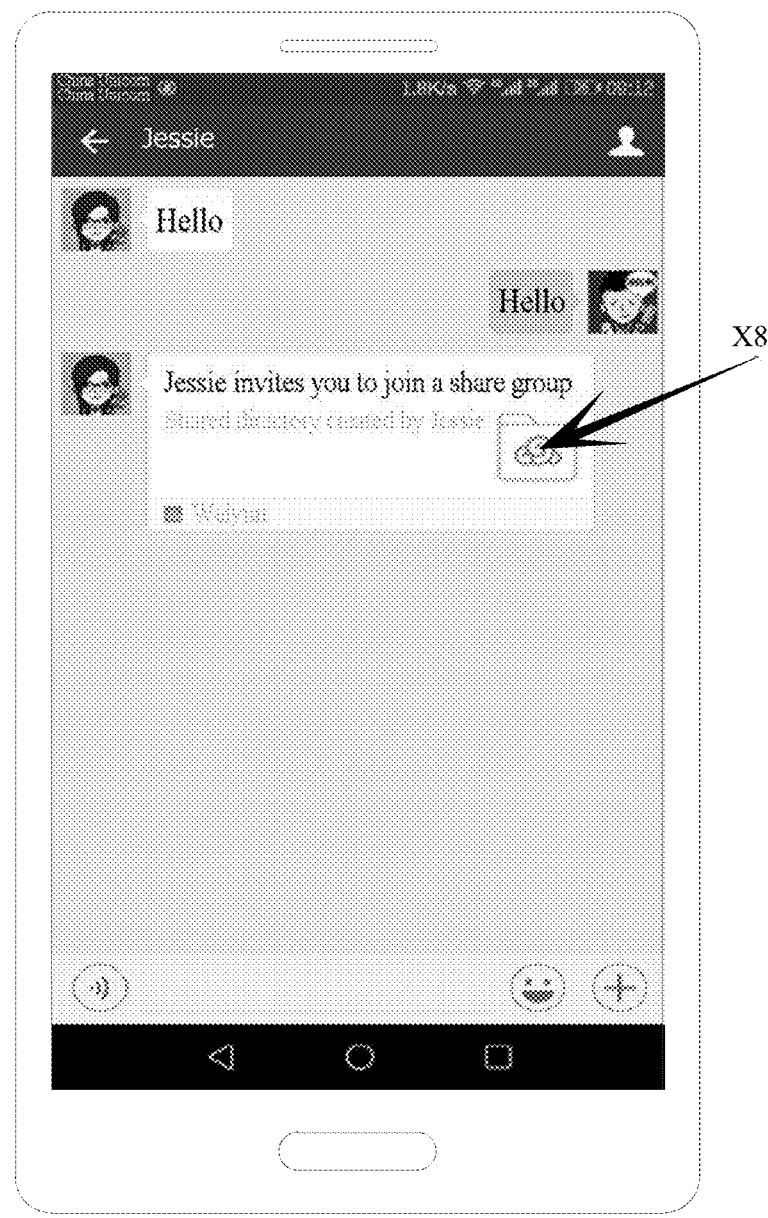
FIG. 11 is a schematic diagram of a chat interface in which a link to an access address of a shared directory is sent according to an embodiment.

For example, in an application scenario shown in FIG. 11, an account "Jessie" sends an access address of a shared directory "Shared directory created by Jessie" to a user corresponding to an account "Wayne", and the user corresponding to the account "Wayne" may tap the access address indicated by X8 in FIG. 11, to access the shared directory.

In an example embodiment, when sending the shared directory to the terminal associated with the second account, the cloud disk server may not send all data in the shared directory to the terminal associated with the second account, but may send the access address of the shared directory to the terminal associated with the second account. After receiving the access address, the terminal associated with the second account may access the shared directory and a file in the shared directory by using the access address.

Referring back to FIG. 3, the file sharing method may further include operation S308. In operation S308: The cloud disk server assigns access permission for the shared directory to the second account.

When accessing the shared directory and data in the shared directory by using the access address of the shared directory, the terminal associated the second account may perform various operations on the file in the shared directory, including, for example but not limited to, a reading operation, a download operation, a deletion operation, or a file addition operation.

In an example embodiment, after the terminal associated with the first account initiates a share operation for the shared directory to the terminal associated with the second account, the cloud disk server assigns the access permission for the shared directory to each second account. For example, the access permission may include a file that can be accessed, and operation permission for the file.

A creator of the shared directory may perform user-defined setting on the access permission of the second account, or the cloud disk server may automatically assign the access permission according to settings of the user, or the cloud disk server automatically assigns the access permission to the second account.

After operations S102 to S106 and operations S302 to S308 are performed, the shared directory is created, and the terminal associated with the second account receives a message corresponding to the access address of the shared directory, so that a user corresponding to the second account can tap the access address of the shared directory to access the file in the shared directory.

During specific implementation, the user corresponding to the second account may initiate an access request corresponding to the shared directory on the terminal associated with the second account. For example, in an application scenario shown in FIG. 11, the user may tap a link corresponding to the access address of the shared directory to initiate a file access request for the access address of the shared directory, to access the shared directory.

In an example embodiment, the terminal that initiates the file access request for the access address of the shared address is the terminal associated with the target account, and the account logged into on the terminal is the target account.

Referring back to FIG. 3, the file sharing method may further include operation S310. In operation S310, the cloud disk server receives a file access request for the access address that is sent by a terminal associated with a target account, obtains the shared directory corresponding to the access address, obtains access permission of the target account for the shared directory, and responds to the file access request according to the access permission.

It may be understood that if the target account is the second account, the foregoing operation S310 may alternatively be an operation in which the cloud disk server receives a second account identifier sent by the terminal associated with the first account, and obtains the corresponding second account according to the second account identifier, the second account identifier being an account identifier selected by the user on the terminal associated with the first account.

After the user initiates the file access request for the access address of the shared directory on the terminal associated with the target account, the cloud disk server parses the received file access request after receiving the file access request, and determines the shared directory corresponding to the access address included in the file access request, that is, the target shared directory. The cloud disk server then determines access permission of the target account for the target shared directory according to the account identifier of the target account that is included in the file access request, and then determines whether the target account has operation permission of a specific operation in the file access request, to determine how to respond to the received file access request.

Figure 12:
FIG. 12 is a schematic diagram of a page of a shared directory of a cloud disk application according to an embodiment.
Figure 13:
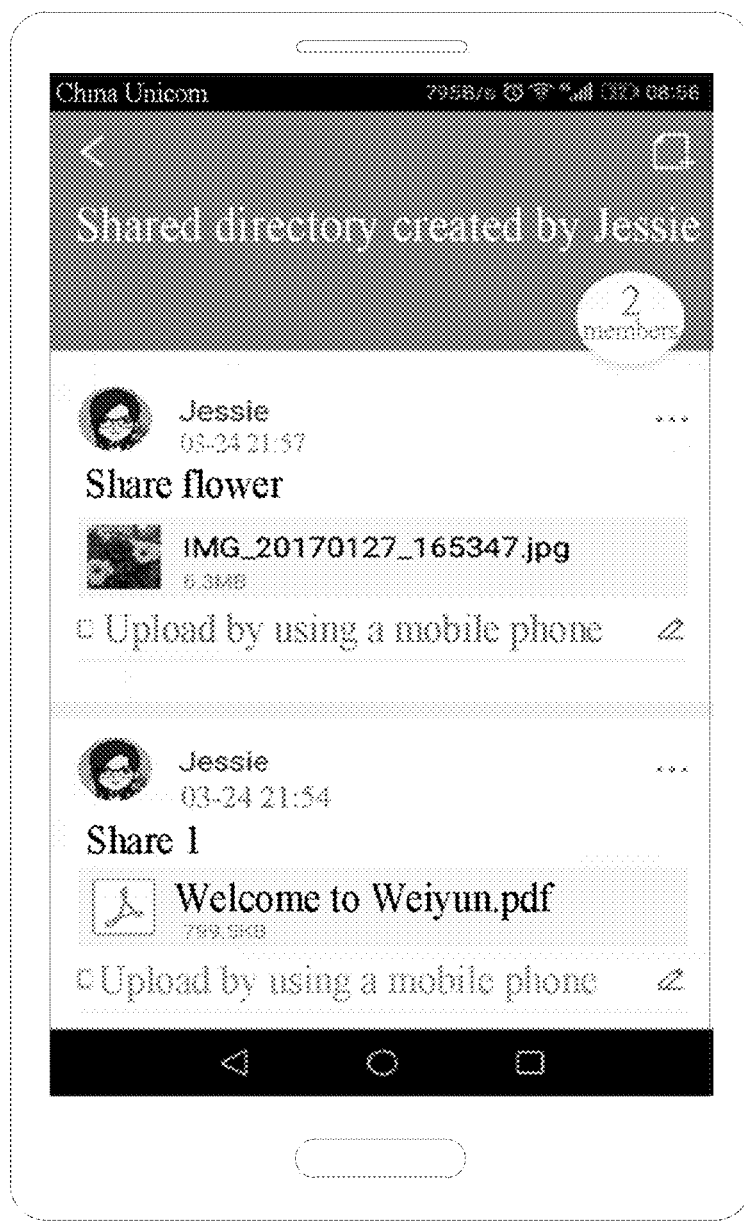
FIG. 13 is a schematic diagram of a details page of a shared directory according to an embodiment.

FIG. 12 shows a list of all shared directories that are created and joined by a current account, and the shared directory may be accessed by tapping identification information of the shared directory. In an example application scenario shown in FIG. 12, when a shared directory "Shared directory created by Jessie" indicated by X9 in FIG. 12 is tapped, a details page corresponding to the shared directory, for example, a details page shown in FIG. 13 corresponding to the shared directory "Shared directory created by Jessie", can be accessed. In addition, in the page shown in FIG. 13, the user may tap a file in the shared directory to access or download the file, or perform another operation on the file.

Specifically, in an example embodiment, the access permission may include: download permission, file modification permission, file creation permission, and deletion permission, and the access permission of the target account for the target shared directory includes one or more of the download permission, the file modification permission, the file creation permission, and the deletion permission.

In an example embodiment, when the access permission of the target account for the shared directory includes the download permission, a file specified in the file access request is allowed to be sent to the terminal associated with the second account.

That is, if the file access request for the shared directory that is initiated by the terminal associated with the target account includes a download request for a file in the shared directory, it is determined whether the target account has the download permission for the shared directory; if yes, the cloud disk server is allowed to send, to the terminal associated with the target account, the file specified in the file access request, that is, the terminal associated with the target account is allowed to download the specified file; otherwise, the user is informed that the user does not have the corresponding download permission.

In another example embodiment, when the access permission of the target account for the shared directory includes the file modification permission, the terminal associated with the target account is allowed to modify the file specified in the file access request.

That is, if the file access request for the shared directory that is initiated by the terminal associated with the target account includes a modification request for the file in the shared directory, it is determined whether the target account has the modification permission for the shared directory; and if yes, the file specified in the file access request is allowed to be presented on the terminal associated with the target account, and a modification operation entered by using the terminal associated with the target account is detected, and after modification is complete, a modified file is uploaded to the cloud disk server to replace the file specified in the file access request.

In another example embodiment, when the access permission of the target account for the shared directory includes the file creation permission, a file is allowed to be created in the shared directory according to file information included in the file access request. That is, if the target account has the file creation permission for the shared directory, it indicates that the user corresponding to the target account can add another file to the shared directory.

In another example embodiment, when the access permission of the target account for the shared directory includes the deletion permission, the file specified in the shared directory by the file access request is allowed to be deleted. That is, only when the target account has the deletion permission for the shared directory, the corresponding user is allowed to delete the file in the shared directory when accessing the shared directory; otherwise, any file in the shared directory cannot be deleted.

It should be noted that the access permission of the second account for the shared directory may not only be determined by the terminal associated with the first account by detecting an entered access permission setting instruction or automatically set by the cloud disk server, and in another example embodiment, the access permission of the second account for the shared directory may alternatively be assigned by the cloud disk server according to a request of the second account.

In an optional embodiment, before the cloud disk server assigns the access permission for the shared director to the second account, the file sharing method may further include receiving, by the cloud disk server, a service value transfer request for the first account that is sent by the terminal associated with the second account, and obtaining a service value carried in the service value transfer request; and transferring the service value from the second account to the first account. In addition, the assigning access permission for the shared directory to the second account assigns the access permission for the shared directory to the second account according to the service value when the service value is successfully transferred.

That is, if the second account does not have the access permission for the shared directory or does not have specific access permission, but intends to access the file in the shared directory, the user corresponding to the second account may initiate a permission purchasing request for the shared directory to the cloud disk server by using the terminal associated with the second account. For example, in a shared directory A, an account B does not have download permission for the shared directory A. In this case, a user corresponding to the second account B may send a download permission purchasing request for the shared directory A to the cloud disk server by using a terminal associated with the second account B.

In an example embodiment, the permission purchasing request for the shared directory is a service value transfer request for a creation account (or the first account) of the shared directory, that is, a service value of the second account is transferred to a service value of the first account. After receiving the service value transfer request, the cloud disk server parses the service value transfer request, obtains the service value carried in the service value transfer request, and then transfers the service value from the second account to the first account.

In addition, when the service value is successfully transferred, the access permission for the shared directory is assigned to the second account according to the service value. For example, when the service value transfer request carries access permission corresponding to the request, the cloud disk server assigns the access permission carried in the service value transfer request to the second account. For another example, different service values may be set for different access permission for the shared directory, and the cloud disk server may determine, according to the service value carried in the service value transfer request initiated by the terminal associated with the second account, access permission matching the service value.

In an optional embodiment, the access permission further includes a threshold of a number of downloads that can be made. That is, the threshold of downloads is set for the shared directory or the target file in the shared directory. That is, a number of downloads for the shared directory or the target file in the shared directory cannot exceed the preset threshold of downloads, or a number of downloads by the target account from the shared directory or the target file in the shared directory cannot exceed the threshold of downloads.

Specifically, if the file access request for the shared directory that is initiated by the terminal associated with the target account includes a download request for the file in the shared directory, in this case, the cloud disk server obtains a number of previous (or historical) downloads by the target account from the shared directory; when the number of previous downloads is less than the threshold of downloads in the access permission, sends the file corresponding to the file access request to the terminal associated with the target account; and when the number of previous downloads is equal to or greater than the threshold of downloads in the access permission, rejects to send the file specified in the file access request to the terminal associated with the target account, and sends a prompt message of restricted access permission to the terminal associated with the target account, to prompt the user corresponding to the target account. In addition, the user may further initiate the service value transfer request to obtain the corresponding access permission, to download the file again.

In another embodiment, the access permission may not only include a limitation to the threshold of a number of downloads, and may also include a time corresponding to the access permission, that is, an authorization time.

Specifically, the access permission further includes an authorization expiration information, and the authorization expiration information indicates when an authorization time expires corresponding to an authorization time of the second account or the target account for the shared directory. When a time period from a time point at which the file access request is initiated exceeds the authorization time, the file access request initiated by the terminal associated with the target account is not responded (or the file access request is rejected).

In an example embodiment, a system time may be obtained, and the file corresponding to the access request is sent to the terminal associated with the target account when the system time does not exceed the authorization expiration time in the access permission.

When receiving the file access request initiated by the terminal associated with the target account, the cloud disk server may obtain the system time; determine whether the obtained system time is within the authorization time corresponding to the access permission of the target account (that is, determines whether the system time does not exceed the authorization expiration time corresponding to the access permission of the target account); if yes, respond to the file access request (or approves the file access request) sent by the terminal associated with the target account, that is, send the file corresponding to the file access request to the terminal associated with the target account; and if no, reject to respond to the file access request sent by the terminal associated with the target account.

As described above, the creation account of the shared directory may set a correspondence between the access permission for the created shared directory and the service value. Specifically, the user may set an authorization service value corresponding to the access permission for the shared directory by using the terminal associated with the first account.

That is, based on the shared directory corresponding to the first account being created, the terminal associated with the first account detects an entered setting instruction for the authorization service value of the shared directory, and then sends an entered specific value of the authorization service value of the shared directory to the cloud disk server.

Based on receipt of a message that is sent by the terminal associated with the first account and that corresponds to the authorization service value of the shared directory, the cloud disk server sets the authorization service value of the shared directory according to the message sent by the terminal associated with the first account. Thus, another user may transfer a corresponding service value to the first account, to obtain the access permission for the shared directory. Therefore, another user having no access permission is provided with a channel to access the shared directory.

In an optional embodiment, the responding to the file access request according to the access permission further includes: when the target account is not the second account, sending the authorization service value of the shared directory to the terminal corresponding to the target account; receiving the service value transfer request for the first account that is sent by the terminal associated with the target account, and obtaining the corresponding service value; transferring the service value from the target account to the first account; and assigning the access permission for the shared directory to the target account when the service value satisfies the authorization service value.

If the target account that initiates the file access request is not the second account indicated by the first account in operation 304, the target account does not have the corresponding access permission for accessing the shared directory. In this case, if the terminal associated with the target account stills initiates the file access request for the shared directory, the specified authorization service value of the shared directory may be sent to the terminal corresponding to the target account, so that the user may transfer the service value corresponding to the authorization service value to the first account, to obtain the access permission for the shared directory.

If the user initiates the service value transfer request for the shared directory on the terminal associated with the target account, the cloud disk server receives the service value transfer request sent by the terminal associated with the target account, and obtains the service value included in the received service value transfer request. The cloud disk server determines whether the service value satisfies the authorization service value corresponding to the shared directory, for example, determines whether the service value is greater than or equal to the authorization service value, and when a determining result is yes, transfers the service value included in the service value transfer request from the target account to the first account, and assigns the access permission corresponding to the shared directory to the target account.

That is, when the target account is not the second account, but is a third account, operation S310 may additionally and/or alternatively include:

receiving a file access request for the access address that is sent by a terminal associated with the third account, and obtaining the shared directory corresponding to the access address, the third account being different from the second account and having no access permission for the shared directory;

sending the authorization service value of the shared directory to the terminal associated with the third account;

receiving a service value transfer request for the first account that is sent by the terminal associated with the third account, and obtaining a service value carried in the service value transfer request;

transferring the service value from the third account to the first account; and assigning the access permission for the shared directory to the third account when the service value satisfies the authorization service value, and according to the access permission, responding to the file access request sent by the terminal associated with the third account.

Figure 14:
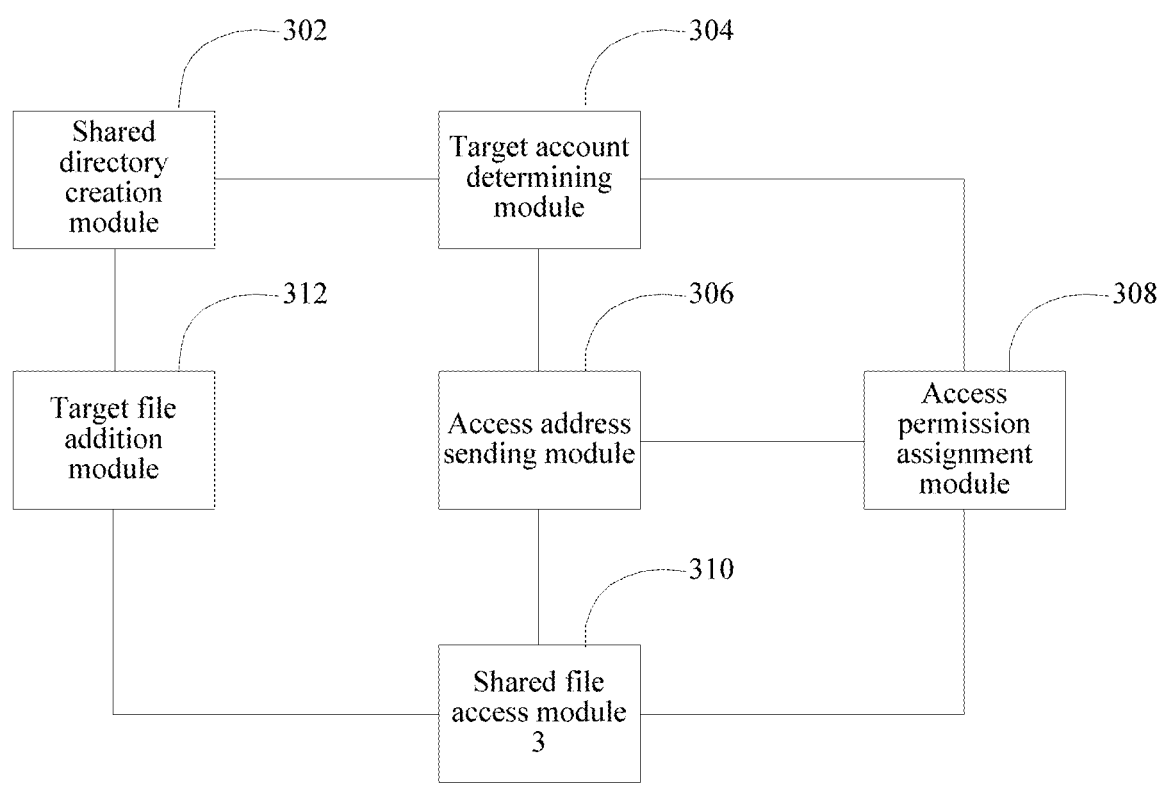
FIG. 14 is a schematic structural diagram of a file sharing apparatus based on a cloud disk server according to an embodiment.

In the related art, there is a technical problem of requiring a complex operation process in which the user needs to send the files one by one during file sharing based on a cloud disk server in the conventional technology. To solve this problem, example embodiments provide an apparatus that improves speed, usability, and efficiency in file sharing. In an example embodiment, as shown in FIG. 14, a file sharing apparatus is further provided. The file sharing apparatus is based on a cloud disk server 30. The file sharing apparatus includes at least one memory and at least one processor. The at least one memory stores at least one instruction module configured to be executed by the at least one processor. The at least one instruction module includes: a shared directory creation module 302, a target account determining module 304, an access address sending module 306, an access permission assignment module 308, and a shared file access module 310.

The shared directory creation module 302 is configured to: receive a shared directory creation request sent by a terminal associated with a first account, and create a shared directory corresponding to the first account.

The target account determining module (that is, a second account determining module) 304 is configured to: receive a target account identifier sent by the terminal associated with the first account, and obtain a corresponding second account according to the target account identifier. That is, the second account determining module is configured to: receive a second account identifier sent by the terminal associated with the first account, and obtain a corresponding second account according to the target account identifier. The second account identifier is an account identifier selected by a user on the terminal associated with the first account.

The access address sending module 306 is configured to send an access address of the shared directory to a terminal associated with the second account.

The access permission assignment module 308 is configured to assign access permission for the shared directory to the second account.

The shared file access module (or a file access response module) 310 is configured to: receive a file access request for the access address that is sent by a terminal associated with a target account, obtain the shared directory corresponding to the access address, obtain access permission of the target account for the shared directory, and respond to the file access request according to the access permission. That is, the file access response module is configured to: receive a file access request for the access address that is sent by the terminal associated with the second account, obtain the shared directory corresponding to the access address, obtain the access permission of the second account for the shared directory, and respond to the file access request according to the access permission.

Optionally, in an embodiment, the target account determining module 304 is further configured to: obtain an associated account of the first account on a social relationship chain, and send an account identifier of the associated account the terminal associated with the first account, so that the terminal associated with the first account presents the account identifier of the associated account, and determines a selected target account identifier according to a selection operation.

Optionally, in an embodiment, as shown in FIG. 14, the apparatus further includes a target file addition module 312, configured to: receive a file addition request sent by the terminal associated with the first account for the shared directory, and obtain a target file identifier included in the file addition request, the target file identifier being identification information of a file stored in cloud storage space; and add the target file identifier to the shared directory.

Optionally, in an embodiment, the access permission includes download permission, file modification permission, file creation permission, and deletion permission; the shared file access module 310 is further configured to: when the access permission of the target account for the shared directory includes the download permission, allow a file specified in the file access request to be sent to the terminal associated with the target account; when the access permission of the target account for the shared directory includes the file modification permission, allow the terminal associated with the target account to modify the file specified in the file access request; and when the access permission of the target account for the shared directory includes the file creation permission, allow a file to be created in the shared directory according to file information included in the file access request; and the shared file access module is further configured to: when the access permission of the target account for the shared directory includes the deletion permission, allow the file specified in the shared directory by the file access request to be deleted.

Optionally, in an embodiment, the access permission further includes a threshold of a number of downloads; and the shared file access module 310 is further configured to: obtain a number of previous (or historical) downloads by the target account from the shared directory, and send a file corresponding to the file access request to the terminal associated with the target account when the number of previous downloads is less than the threshold of a number of downloads in the access permission.

Optionally, in an embodiment, the access permission further includes an authorization expiration time; and the shared file access module 310 is further configured to: obtain a system time, and send a file corresponding to the file access request to the terminal associated the target account when the system time does not exceed the authorization expiration time in the access permission.

Optionally, in an embodiment, the access permission assignment module 308 is further configured to: receive a service value transfer request for the first account that is sent by the terminal associated with the second account, and obtain a service value carried in the service value transfer request; and transfer the service value from the second account to the first account; and the assigning access permission for the shared directory to the second account is assigning the access permission for the shared directory to the second account according to the service value when the service value is successfully transferred. That is, the access permission assignment module is specifically configured to: receive the service value transfer request for the first account that is sent by the terminal associated with the second account, obtain the service value carried in the service value transfer request, and transfer the service value from the second account to the first account; and assign the access permission for the shared directory to the second account according to the service value when the service value is successfully transferred.

Optionally, in an embodiment, the shared directory creation module 302 is further configured to: set an authorization service value of the shared directory according to a message sent by the terminal associated with the first account; and the shared file access module is further configured to: send the authorization service value of the shared directory to a terminal corresponding to the target account when the target account is not the second account; receive a service value transfer request for the first account that is sent by the terminal associated with the target account, and obtain a corresponding service value; transfer the service value from the target account to the first account; and assign the access permission for the shared directory to the target account when the service value satisfies the authorization service value.

That is, the shared directory creation module is further configured to: after receiving a message that is sent by the terminal associated with the first account and that corresponds to an authorization service value of the shared directory, set the authorization service value; and the file access response module is a first file access response module, the apparatus further includes a second file access response module, and the module is configured to: receive a file access request for the access address that is sent by a terminal associated with a third account, and obtain the shared directory corresponding to the access address, the third account being different from the second account and having no access permission for the shared directory; send the authorization service value of the shared directory to the terminal associated with the third account; receive a service value transfer request for the first account that is sent by the terminal associated with the third account, and obtain a service value carried in the service value transfer request; transfer the service value from the third account to the first account; and assign the access permission for the shared directory to the third account when the service value satisfies the authorization service value, and respond to, according to the access permission, the file access request sent by the terminal associated with the third account.

Figure 15:
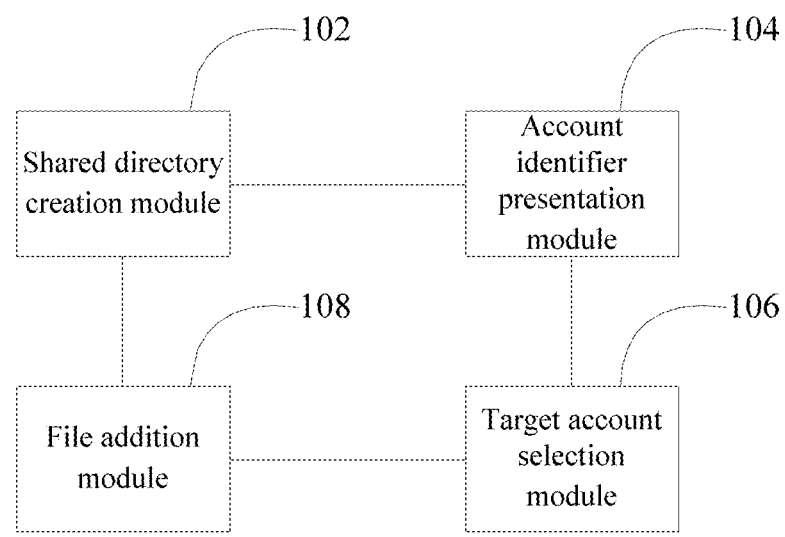
FIG. 15 is a schematic structural diagram of a file sharing apparatus based on a terminal associated with a first account according to an embodiment.

To solve the technical problem of requiring a complex operation process in which the user needs to send the files one by one during file sharing based on a cloud disk server in the conventional technology, in an embodiment, as shown in FIG. 15, a file sharing apparatus is further provided. The file sharing apparatus is based on a terminal 10 associated with a first account. The file sharing apparatus includes at least one memory and at least one processor. The at least one memory stores at least one instruction module configured to be executed by the at least one processor. The at least one instruction module includes: a shared directory creation module 102, an account identifier presentation module 104, and a target account selection module 106.

The shared directory creation module 102 is configured to: receive an entered shared directory creation instruction, obtain a first account logged into on a cloud disk server, and create a shared directory corresponding to the first account on the cloud disk server. That is, the shared directory creation module is configured to: receive an entered shared directory creation instruction, obtain a first account logged into on a cloud disk server, and send a shared directory creation request to the cloud disk server, the shared directory creation request being used for instructing the cloud disk server to create a shared directory corresponding to the first account.

The account identifier presentation module 104 is configured to: receive an account identifier delivered by the cloud disk server, and present the account identifier, the account identifier being an identifier of an associated account of the first account on a social relationship chain.

The target account selection module (or a second account selection module) 106 is configured to: obtain a selected account identifier as a target account identifier, and send the target account identifier to the cloud disk server, so that the cloud disk server obtains a corresponding second account according to the target account identifier, sends an access address of the shared directory to a terminal associated with the second account, assigns access permission for the shared directory to the second account, receives a file access request for the access address that is sent by a terminal associated with a target account, obtains the shared directory corresponding to the access address, obtains access permission of the target account for the shared directory, and responds to the file access request according to the access permission. That is, the second selection module is configured to: obtain an account identifier selected by a user, and use the account identifier selected by the user as a second account identifier and send the second account identifier to the cloud disk server, so that the cloud disk server obtains a corresponding second account according to the second account identifier, assigns access permission for the shared directory to the second account, and sends an access address of the shared directory to a terminal associated with the second account.

A file sharing apparatus in an embodiment may further include a file access request module (not shown in FIG. 15). The file access request module is configured to: receive the access address sent by the cloud disk server, and send a file access request for the access address to the cloud disk server, so that the cloud disk server obtains the shared directory corresponding to the access address, obtains the access permission for the shared directory that is of the second account corresponding to a sending terminal of the file access request, and responds to the file access request according to the access permission.

Optionally, in an embodiment, as shown in FIG. 15, the apparatus further includes a file addition module 108, configured to: receive a file addition request entered for the shared directory, obtain a target file identifier included in the file addition request, and send the shared directory and the target file identifier to the cloud disk server, so that the cloud disk server adds the target file identifier to the shared directory.

By implementing the embodiments of the disclosure, the following beneficial effects are obtained.

Based on a file sharing method and a file sharing apparatus according to example embodiments, a cloud disk application and social software (or social network software) may be combined, and in order to share a file with another user or share a file already stored on the cloud disk server with another user, the user only needs to create the shared directory in a cloud disk, and then adds, to the shared directory, the file to be shared, to send the access address of the shared directory to the another user by using the social software, so that the another user can manipulate (e.g., tap) the access address to access the shared directory and the file in the shared directory. That is, the user does not need to send, to the another user one by one, files that need to be shared, and only needs to send the access address of the shared directory to a user with which the files need to be shared, thereby avoiding a complex operation process in which the user needs to send the files one by one during file sharing, and improving the speed, usability, and efficiency in the file sharing.

All or some of the foregoing embodiments may be implemented through software, hardware, firmware, or any combination thereof. When the embodiments are implemented by using a software program, all or some of the embodiments may be implemented in a form of a computer program product. The computer program product includes one or more computer instructions. When the computer program instructions are loaded and executed on a computer, all or some of the processes or functions according to the embodiments of the disclosure are produced. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (such as a coaxial cable, a fiber, or a digital subscriber line (DSL)) or wireless (such as infrared, radio, or microwave) manner. The computer-readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a DVD), a semiconductor medium (such as a solid state disk (SSD)), or the like.

Figure 16:
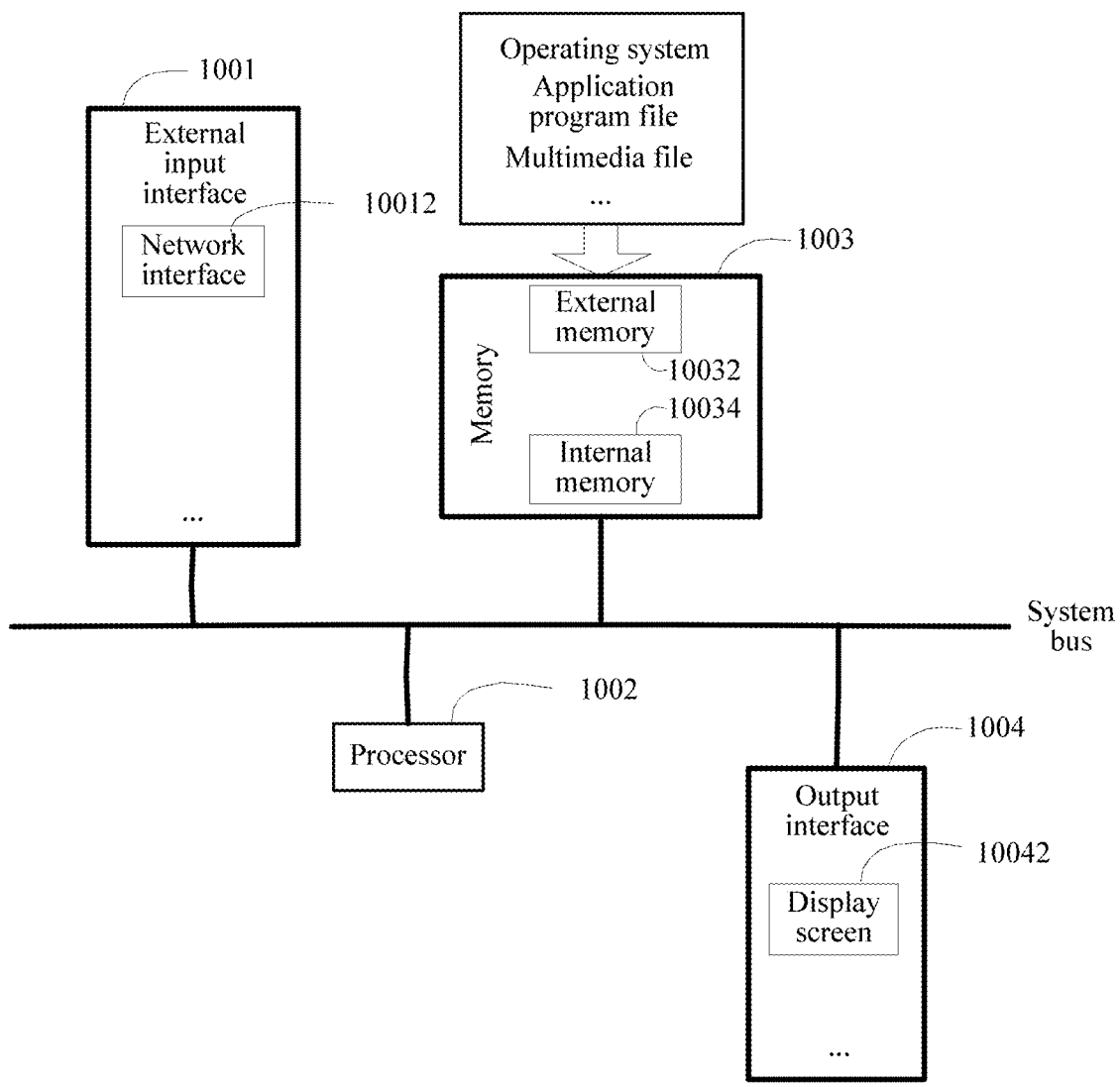
FIG. 16 is a schematic structural diagram of a computer device running the foregoing file sharing method according to an embodiment.

FIG. 16 shows a terminal of a Von Neumann-based computer system running the foregoing file sharing method. The computer system may be a terminal device, such as a smartphone, a tablet computer, a palmtop computer, a notebook computer, or a personal computer. Specifically, the computer system may include an external input interface 1001, a processor 1002, a memory 1003, and an output interface 1004 that are connected through a system bus. Optionally, the external input interface 1001 may include at least a network interface 10012. The memory 1003 may include an external memory 10032 (such as a hard disk, an optical disc, or a floppy disk) and an internal memory 10034. The output interface 1004 may include at least a device such as a display screen 10042.

In an example embodiment, the method is run based on a computer program, and a program file of the computer program is stored in the external memory 10032 of the Von Neumann-based computer system, is loaded into the internal memory 10034 when run, and is then compiled into machine code and transferred to the processor 1002 for execution, so that a shared directory creation module 302, a target account determining module 304, an access address sending module 306, an access permission assignment module 308, a shared file access module 310, a target file addition module 312 and a shared directory creation module 102, an account identifier presentation module 104, a target account selection module 106, and a file addition module 108 are logically formed in the Von Neumann-based computer system. In addition, in the process of performing the foregoing file sharing method, input parameters are all received through the external input interface 1001, are transferred to the memory 1003 for caching, and then are input into the processor 1002 for processing. Processed result data is cached in the memory 1003 for subsequent processing or is transferred to the output interface 1004 for output.

Specifically, a processor of a terminal 10 associated with a first account is configured to perform the following operations:

receiving an entered shared directory creation instruction, obtaining a first account logged into on a cloud disk server, and creating a shared directory corresponding to the first account on the cloud disk server;

receiving an account identifier delivered by the cloud disk server, and presenting the account identifier, the account identifier being an identifier of an associated account of the first account on a social relationship chain; and obtaining a selected account identifier as a target account identifier, and sending the target account identifier to the cloud disk server.

Further, a processor 1002 of a cloud disk server 30 is configured to perform the following operations:

receiving a shared directory creation request sent by a terminal associated with a first account, and creating a shared directory corresponding to the first account;

receiving a target account identifier sent by the terminal associated with the first account, and obtaining a corresponding second account according to the target account identifier;

sending an access address of the shared directory to a terminal associated with the second account;

assigning access permission for the shared directory to the second account; and receiving a file access request for the access address that is sent by a terminal associated with a target account, obtaining the shared directory corresponding to the access address, obtaining access permission of the target account for the shared directory, and responding to the file access request according to the access permission.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A file sharing method performed by at least one processor to share a file between a plurality of users of different accounts in a file sharing application program, the method comprising:

receiving, by the at least one processor, a shared directory generation request from a first terminal that is logged into the file sharing application program with a first account of a first user, and generating a shared directory corresponding to the first account;

receiving, by the at least one processor, a second account identifier from the first terminal associated with the first account, and obtaining a second account of a second user in the file sharing application program based on the second account identifier, the second account being different from the first account;

transmitting, by the at least one processor, an access address of the shared directory to a second terminal associated with the second account and configured by the file sharing application program;

assigning to the second account, by the at least one processor, access permission to access the shared directory; and receiving, by the at least one processor, a file access request with respect to the access address from the second terminal that is logged into the file sharing application program with the second account, obtaining the shared directory corresponding to the access address, obtaining the access permission of the second account, and responding to the file access request based on the access permission, wherein the access permission comprises at least one of a threshold of a number of downloads permissible to the second account or an authorization expiration time indicating when an authorization time expires to reject the file access request.

2. The file sharing method according to claim 1, wherein the receiving the second account identifier comprises:

obtaining at least one associated account of the first account on a social relationship chain, and transmitting at least one account identifier of the at least one associated account to the first terminal associated with the first account; and receiving the second account identifier based on selection from the at least one account identifier of the at least one associated account.

3. The file sharing method according to claim 1, further comprising:

receiving, by the at least one processor, a file addition request from the first terminal associated with the first account, and obtaining a target file identifier included in the file addition request, the target file identifier being identification information of a file stored in cloud storage space; and adding, by the at least one processor, the target file identifier to the shared directory.

4. The file sharing method according to claim 1, wherein the access permission comprises at least one of download permission, file modification permission, file generation permission, or deletion permission, and the responding to the file access request comprises:

in response to the access permission comprising the download permission, allowing a file corresponding to the file access request to be transmitted to the second terminal associated with the second account;

in response to the access permission comprising the file modification permission, allowing the second terminal associated with the second account to modify the file indicated in the file access request;

in response to the access permission comprising the file generation permission, allowing the second terminal associated with the second account to generate a file in the shared directory based on file information included in the file access request; and in response the access permission comprising the deletion permission, allowing the second terminal associated with the second account to delete the file indicated in the shared directory by the file access request.

5. The file sharing method according to claim 1, wherein the access permission comprises the threshold of the number of downloads, and the responding to the file access request comprises:

obtaining a number of previous downloads by the second account from the shared directory, and transmitting a file corresponding to the file access request to the second terminal associated with the second account in response to the number of previous downloads not exceeding the threshold of the number of downloads in the access permission.

6. The file sharing method according to claim 1, wherein the access permission comprises the authorization expiration time, and the responding to the file access request comprises:

obtaining a system time, and transmitting a file corresponding to the file access request to the second terminal associated with the second account in response to the system time not exceeding the authorization expiration time in the access permission.

7. The file sharing method according to claim 1, wherein the assigning the access permission comprises:

receiving a service value transfer request with respect to the first account from the second terminal associated with the second account, obtaining a service value included in the service value transfer request, and transferring the service value from the second account to the first account; and assigning the access permission to the second account based on the service value.

8. The file sharing method according to claim 1, further comprising:

receiving, by the at least one processor from the first terminal associated with the first account, a message corresponding to an authorization service value of the shared directory;

receiving, by the at least one processor, the file access request from a third terminal associated with a third account, and obtaining the shared directory corresponding to the access address, the third account being different from the second account and having no access permission to access the shared directory;

transmitting, by the at least one processor, the authorization service value of the shared directory to the third terminal associated with the third account;

receiving, by the at least one processor, a service value transfer request with respect to the first account from the third terminal associated with the third account, and obtaining a service value included in the service value transfer request;

transferring, by the at least one processor, the service value from the third account to the first account; and assigning, by the at least one processor, the access permission to access the shared directory to the third account based on the service value satisfying the authorization service value, and responding to, based on the access permission, the file access request from the third terminal associated with the third account.

9. A file sharing apparatus for sharing a file between a plurality of users of different accounts in a file sharing application program, comprising:

at least one memory operable to store program code; and at least one processor operable to access said at least one memory, read said program code, and operate according to said program code, said program code comprising:
shared directory generation code configured to cause the at least one processor to receive a shared directory generation request from a first terminal that is logged into the file sharing application program with a first account of a first user, and generate a shared directory corresponding to the first account;
second account determination code configured to cause the at least one processor to receive a second account identifier from the first terminal associated with the first account, and obtain a second account of a second user in the file sharing application program based on the second account identifier, the second account being different from the first account;
access address transmission code configured to cause the at least one processor to transmit an access address of the shared directory to a second terminal associated with the second account and configured by the file sharing application program;
access permission assignment code configured to cause the at least one processor to assign, to the second account, access permission to access the shared directory; and
file access response code configured to cause the at least one processor to receive a file access request with respect to the access address from the second terminal that is logged into the file sharing application program, obtain the shared directory corresponding to the access address, obtain the access permission of the second account, and respond to the file access request based on the access permission, wherein the access permission comprises at least one of a threshold of a number of downloads permissible to the second account or an authorization expiration time indicating when an authorization time expires to reject the file access request.

10. The file sharing apparatus according to claim 9, wherein the second account determination code is further configured to cause the at least one processor to:
obtain at least one associated account of the first account on a social relationship chain, and transmit at least one account identifier of the at least one associated account to the first terminal associated with the first account; and
receive the second account identifier based on selection from the at least one account identifier of the at least one associated account.

11. The file sharing apparatus according to claim 9, wherein the program code further comprises target file addition code configured to cause the at least one processor to:
receive a file addition request from the first terminal associated with the first account, and obtain a target file identifier included in the file addition request, the target file identifier being identification information of a file stored in cloud storage space; and
add the target file identifier to the shared directory.

12. The file sharing apparatus according to claim 9, wherein the access permission comprises at least one of download permission, file modification permission, file generation permission, or deletion permission, and the file access response code is further configured to cause the at least one processor to:
in response to the access permission comprising the download permission, allow a file corresponding to the file access request to be transmitted to the second terminal associated with the second account;
in response to the access permission comprising the file modification permission, allow the second terminal associated with the second account to modify the file indicated in the file access request;
in response to the access permission comprising the file generation permission, allow the second terminal associated with the second account to generate a file in the shared directory based on file information included in the file access request; and
in response the access permission comprising the deletion permission, allow the second terminal associated with the second account to delete the file indicated in the shared directory by the file access request.

13. The file sharing apparatus according to claim 9, wherein the access permission comprises the threshold of the number of downloads, and the file access response code is further configured to cause the at least one processor to:
obtain a number of previous downloads by the second account from the shared directory, and transmit a file corresponding to the file access request to the second terminal associated with the second account in response to the number of previous downloads not exceeding the threshold of the number of downloads in the access permission.

14. The file sharing apparatus according to claim 9, wherein the access permission comprises the authorization expiration time, and the file access response code is further configured to cause the at least one processor to obtain a system time, and transmit a file corresponding to the file access request to the second terminal associated with the second account in response to the system time not exceeding the authorization expiration time in the access permission.

15. The file sharing apparatus according to claim 9, wherein the access permission assignment code is further configured to cause the at least one processor to:
receive a service value transfer request with respect to the first account from the second terminal associated with the second account, obtain a service value included in the service value transfer request, and transfer the service value from the second account to the first account; and
assign the access permission to the second account based on the service value.

16. The file sharing apparatus according to claim 9, wherein the shared directory generation code is further configured to cause the at least one processor to receive, from the first terminal associated with the first account, a message corresponding to an authorization service value of the shared directory; and
the file access response code is further configured to cause the at least one processor to:
receive the file access request from a third terminal associated with a third account, and obtain the shared directory corresponding to the access address, the third account being different from the second account and having no access permission to access the shared directory;
transmit the authorization service value of the shared directory to the third terminal associated with the third account;
receive a service value transfer request with respect to the first account from the third terminal associated with the third account, and obtain a service value included in the service value transfer request;

transfer the service value from the third account to the first account; and assign the access permission to access the shared directory to the third account based on the service value satisfying the authorization service value, and respond to, according to the access permission, the file access request from the third terminal associated with the third account.

17. A non-transitory computer-readable storage medium storing computer-readable instructions that are executable by at least one processor to share a file between a plurality of users of different accounts in a file sharing application program by performing:

receiving a shared directory generation request from a first terminal that is logged into the file sharing application program with a first account of a first user, and generating a shared directory corresponding to the first account;

receiving a second account identifier from the first terminal associated with the first account, and obtaining a second account of a second user in the file sharing application program based on the second account identifier, the second account being different from the first account;

transmitting an access address of the shared directory to a second terminal associated with the second account and configured by the file sharing application program;

assigning, to the second account, access permission to access the shared directory; and receiving a file access request with respect to the access address from the second terminal that is logged into the file sharing application program, obtaining the shared directory corresponding to the access address, obtaining the access permission of the second account, and responding to the file access request based on the access permission, wherein the access permission comprises at least one of a threshold of a number of downloads permissible to the second account or an authorization expiration time indicating when an authorization time expires to reject the file access request.

18. The computer-readable storage medium according to claim 17, wherein the instructions are executable by the at least one processor to perform:

obtaining at least one associated account of the first account on a social relationship chain, and transmitting at least one account identifier of the at least one associated account to the first terminal associated with the first account; and receiving the second account identifier based on selection from the at least one account identifier of the at least one associated account.

19. The computer-readable storage medium according to claim 17, wherein the instructions are executable by the at least one processor to perform:

receiving a file addition request from the first terminal associated with the first account, and obtaining a target file identifier included in the file addition request, the target file identifier being identification information of a file stored in cloud storage space; and adding the target file identifier to the shared directory.

20. The computer-readable storage medium according to claim 17, wherein the access permission comprises at least one of download permission, file modification permission, file generation permission, or deletion permission, and the instructions are executable by the at least one processor to perform:

in response to the access permission comprising the download permission, allowing a file indicated in the file access request to be transmitted to the second terminal associated with the second account;

in response to the access permission comprising the file modification permission, allowing the second terminal associated with the second account to modify the file indicated in the file access request;

in response to the access permission comprising the file generation permission, allowing the second terminal associated with the second account to generate a file in the shared directory based on file information included in the file access request; and in response the access permission comprising the deletion permission, allowing the second terminal associated with the second account to delete the file indicated in the shared directory by the file access request.

* * * * *